Jan. 24, 1928. 1,657,270

C. MÜLLER ET AL

STEREOSCOPICAL COLOR PHOTOGRAPHY

Filed Nov. 26, 1924 4 Sheets-Sheet 2

Inventors:
Carl Müller,
Elsa Müller,
By Byrnes Townsend & Brickenstein
attorneys.

C. MÜLLER ET AL 1,657,270

STEREOSCOPICAL COLOR PHOTOGRAPHY

Filed Nov. 26, 1924    4 Sheets-Sheet 4

Inventors:
Carl Müller,
Elsa Müller,
By Byrnes Townsend & Brickenstein
Attorneys.

Patented Jan. 24, 1928.

1,657,270

UNITED STATES PATENT OFFICE.

CARL MÜLLER AND ELSA MÜLLER, OF CHARLOTTENBURG, NEAR BERLIN, GERMANY, ASSIGNORS TO KARL MEY, OF BERLIN, GERMANY.

STEREOSCOPICAL COLOR PHOTOGRAPHY.

Application filed November 26, 1924, Serial No. 752,396, and in Germany August 4, 1921.

Our invention relates to stereoscopical color photography and has for its purpose to simplify the production of the stereoscopically co-ordinated images from which the impression of an object in natural colors is to be built up. To this end our invention consists in certain novel steps of producing the partial images which are required.

In order that our invention may be fully understood by persons skilled in the art we shall describe it with reference to the annexed drawings which merely diagrammatically show constructional means for producing partial images for stereoscopical color photography and diagrams relating to the selection of colored light to be used in the photographic exposures.

Figures 1, 2, 3, 4:
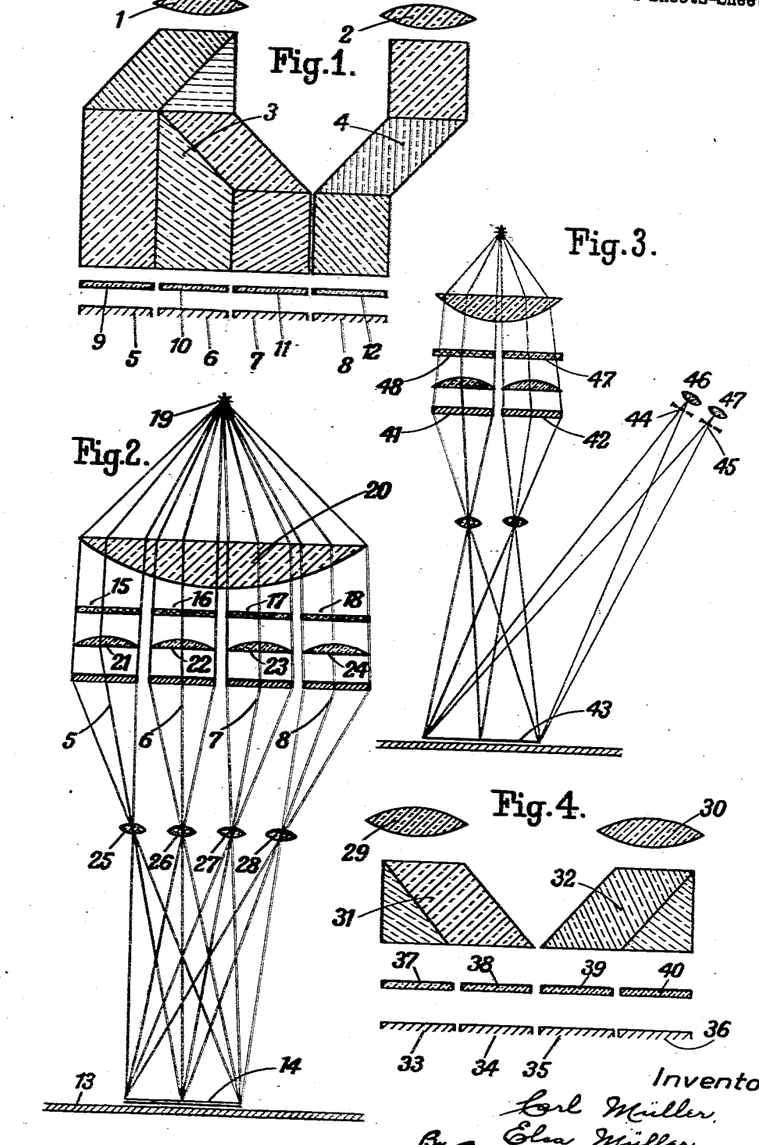
In Figure 1 we have shown an arrangement for producing two sets of photographic images from an object to be reproduced in natural colors through two objectives and co-ordinated prism devices, the one set containing three images and the second set taken through the second objective laterally displaced with relation to the first named objective containing one image only.
Figure 2 illustrates the transforming and uniting of the four partial images produced with the device of Figure 1 into one single image.
Figure 3 illustrates the compounding of two partial images to one single image on a screen by projection and the dissolving contemplation by the eyes of an observer.
Figure 4 shows a modification of the device of Figure 1 allowing the production of two sets of partial images through two laterally displaced objectives, each set consisting of two different images.

In Figure 1 two objectives are designated 1, 2 and prism devices co-ordinated to said objectives 3, 4. The prism device 3 which is known per se is adapted to divide the light passing through the objective 1 into three divisions, each of which is adapted to produce a separate image of an object sending rays of light through the objective 1; these three images being produced on sensitive layer carriers 5, 6, 7. A further image of the same object is produced by objective 2 and prism 4 on a sensitive layer carrier 8.

Interposed between the sensitive layer carriers 5 to 8 and the prism devices 3, 4 are color filters 9 to 12.

The colors of the filters 9 to 11 are preferably so chosen that they correspond to the fundamental colors of the spectrum whereas the color filter 12 may be of any color and may even be entirely omitted.

The insertion of the color filters 9 to 12 has the effect that the light beams passing through the prism devices produce different impressions on the sensitized layer carriers. If ordinary pan-chromatic plates are used then ordinary black white pictures are obtained.

If now the black white pictures 5 to 8 are brought to projection on a screen 13 as illustrated in Figure 2 and if the projecting light beams for each picture are suitably colored in dependence from the color of the filters 9 to 12 then the compound image 14 on the screen can be dissolved on inspection with spectacles having two differently colored glasses into two images, each presented only to one eye of the spectator and the two images producing together the impression of the stereoscopic image of the object in natural colors.

In Figure 2 of the drawing the colored light for projection of the pictures 5 to 8 is produced by inserting of color filters 15, 16, 17, 18 into the path of light rays coming from a source of light 19. A lens arrangement 20 and 21 to 24 being provided for suitably controlling of the direction of rays of light before impinging on the pictures 5 to 8. The projection objectives are designated 25 to 28.

Preferably the colors of the filters 15 to 17 are substantially the same as the colors of the filters 9 to 11 through which the pictures were taken, however with exclusion of at least one limited portion of the spectrum, this limited portion of the spectrum fully or partly corresponding to the color of the filter 18. The coloration of the lenses of the spectacles for inspection above mentioned are to be so chosen that one glass is substantially permeable for the colors of the filters 15—17, but impermeable for the color of filter 18 and the other filter permeable for light in the color of filter 18 and impermeable for light in the colors of filters 15—17.

If the colors for the filters and eye glasses are selected in this way then the one eye of the observer has communicated to it an image of the object containing all the three fundamental colors of the spectrum whereas the other eye receives an image which before all has the effect to supplement the said colored image presented to the one eye so as to make it a stereoscopic one.

The presentation to the one eye of an image containing all three fundamental colors of the spectrum has the valuable effect that a conflict of the colors with each other is avoided. Moreover the compound image containing the three images of the object taken from the same position may be used without the stereoscopically co-ordinated fourth image as a normal image of the object in natural colors.

Suitable colors for the filters 9 to 11 are the usual colors for the light filters in three color photography whereas filters 15 to 17 used in the projection of the black white pictures may preferably be colored for instance red, blue-green and blue. With these colors for the filters 15—17 the color of filter 18 is preferably yellowish green. The color of the filter 12 is similar to that of the filter 18, it being however immaterial if the color comprises a little more or less of this region of the spectrum or if it even contains still some other portions of the spectrum.

A further suitable color combination for the filters 15 to 17 is red, yellowish green and blue, the filters 9 to 11 being again in the fundamental colors of the spectrum. In this case the filter 18 is preferably blueish green and the filter 12 again similar to filter 18. Filter 18 may also be colored in a color corresponding to a region of the spectrum intermediate two fundamental colors for instance orange, yellow, greenish-yellow or greenish blue. The coloration of the filter 18 may also contain colors corresponding to regions of the spectrum intermediate each two fundamental colors. Besides said intermediate regions of the spectrum the coloration of filter 18 may contain such colors which supplement them to a substantially neutral or whitish color. In all cases care should be taken to co-ordinate the light-permeability of the filter 18 and the quantity of light with which it is fed in such manner that a sufficiently luminous image is obtained.

The filters 15—17 should be colored substantially in the fundamental colors of the spectrum except the region of the spectrum used for filter 18; however ordinarily the region of the spectrum covered by filter 18 may, if desired, somewhat overlap the regions corresponding to the other filters.

Instead of throwing all four images simultaneously on a screen so as to form a compound image they can be thrown singly or in arbitrary combinations in quick succession on the screen. A quick change in color and a division of the projecting light into two color mixtures which are complementary to each other may be obtained by use of polarizing devices. With such devices a beam of light is divided in a double refracting prism into two differently polarized partial beams which by insertion of a double refracting crystal plate for instance a plate of crystallized calcium sulfate and a further eventually double refracting prism can be acted on so as to form complementary colored beams of light.

Instead of direct inspection of the image 14 on a screen 13 at first a colored compound picture can be formed which may be used for being projected on a screen. Such compound picture offers the convenience that the complicated projection device for projecting and superposing of the partial images can be dispensed with.

Such compound picture can be obtained for instance by projecting the beams of colored light passing through the objectives 25 to 28 on a sensitized layer adapted for the production of colored pictures by means of a bleaching method. One can also use a sensitized layer provided with a color screening, the color elements of which being colored substantially in the colors of the filters 15 to 18. Of course instead of one single compound picture on a screened sensitized layer having color sections in four different colors, one can produce two such compound pictures, each provided only with a color screening in two colors or one of said two sensitized layers provided with a color screening in three different colors and one without screening homogeneously colored in one single color only.

In the production of such compound pictures on color screened sensitized layers the color elements of the screened layers and the colors of the filters 15—18 controlling the color of the light should be preferably selected with respect to the colors of the light filters 9 to 12 through which the pictures 5 to 8 were originally taken.

The interdependence between the colors of the filters 9 to 12 and those of the color elements of a screened sensitive layer whereon a compound picture is to be made is for some special embodiments illustrated in Figures 7 to 11. In these figures the arcs shown in full lines represent the regions of the spectrum covered by the colors of the filters 9—11, whereas the arcs shown in dotted lines illustrate the regions of the spectrum covered by the color elements of the screened sensitive layer.

Figure 7:
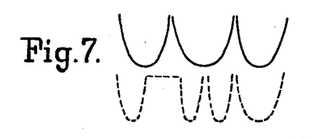
Figures 7 to 12 illustrate different kinds of co-ordination of colors for use in the production of partial images.
Figure 8:
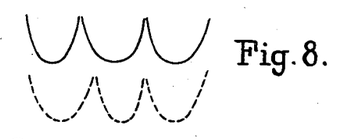

Figures 7 and 8 show an arrangement according to which the regions of the spectrum covered by the screen elements are not to their full extent covered by the filters; such additional regions being either arbitrarily positioned (Figure 7) or adjacent to the region of the filters (Figure 8).

Figure 9:
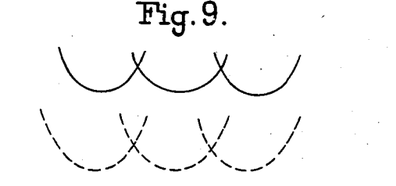
Figure 10:
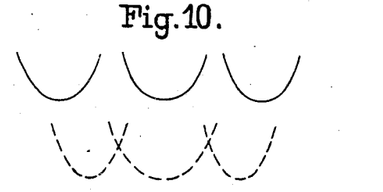
Figure 11:
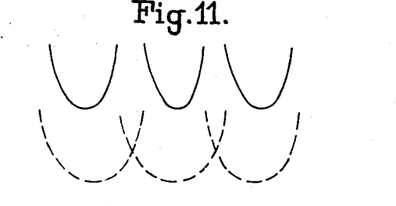

In the examples of Figures 9 to 11 the color regions of the screen elements are overlapping each other this resulting in greater brilliancy of the images.

In Figure 9 the color regions of the filters likewise are overlapping each other, but not to the same extent as the screen elements. Furthermore they also overlap the color regions of the screen elements.

In the examples of Figures 10 and 11 the color regions of the filters are so selected that the light of each filter can only pass through one set of screen elements; Figures 10 and 11 are however distinguished in this that in Figure 11 the color region covered by each of the filters is more limited than that of the color region of the co-ordinated screen elements.

The effect of the color selection represented in Figures 10 and 11 is superior to that of Figure 9 in this, that a more correct color reproduction is obtained. This is due to the fact that although the colors of the screen elements overlap each other, each screen element allows passing of light which had passed one of the filters 5 to 7 only the colors of which are identical with those of the printing filters 15, 16, 17.

Instead of printing the images 5 to 8 on a color screened sensitized layer it is possible to print the several pictures on ordinary sensitized layers, f. i. as positives on thin transparent layers of gelatine or the like and to superpose such thin transparent layers after dyeing with colors which are substantially complementary to the colors of the filters 15 to 18. If such compound images are presented to the eye of an observer then an impression of the natural colors of the object is produced according to the so-called subtractive method whereas the pictures on the color screened sensitized layer result in the reproduction of the object according to the so-called additive method.

Instead of printing the four elementary pictures 5 to 8 on the same screened sensitized surface one could produce two separate prints, the one combining f. i. the pictures 5 to 7 on a screened surface whereas the second would consist of a simple positive of the picture 8. In this case it would be possible to use the prints on the three color screened surface as a non-stereoscopic reproduction of the object in natural colors.

One could also print the pictures 5 to 8 on two different screened sensitized layers in this arrangement that one compound picture is formed combining f. i. the pictures 5, 6 and a further picture combining the pictures 7, 8. This facilitates the printing because it is difficult to produce colored screened sensitized layers with more than two sets of differently colored screen elements. An arrangement of producing two pairs of partial images of the object to be stereoscopically reproduced in natural colors is illustrated in Figure 4. In this figure the numerals 29 and 30 designate two objectives and the numerals 31, 32 two light dividing prism devices, the numerals 33, 34, 35, 36 designate four pan-chromatic sensitized layers and the numerals 37, 38, 39 and 40 four light filters co-ordinated to the sensitized plates 33 to 36. The light filters 37 to 40 are preferably colored respectively red, green, green and blue. Images are taken from the object by the objectives 29, 30 through prism devices 31, 32 and light filters 37 to 40, each of the resulting two pairs of black white partial images 33, 34 and 35, 36 is printed on a two color screened surface using a device similar to that of Figure 2. In this way two compound pictures are obtained, each picture giving a certain color aspect of the object from one position, the two positions different from each other as required for producing a stereoscopical effect. Assuming that the pictures 41 and 42 of Figure 3 are the compound pictures produced, the former from the pictures 33 and 34 and the latter from the pictures 35 and 36 of Figure 4 and further assuming that the screened images 41 and 42 are superpositioned by projection as illustrated in Figure 3 then the compound projection image 43 can be divided up by suitable color selectors 44, 45 into two images giving color aspects of the object contemplated from different points of view so that the eyes 46, 47 of an observer receive these color aspects which produce in the observer the impression of a stereoscopical reproduction of the object in natural colors. This result of course depends from suitable selection of the colors.

Although four different colors for the four partial images could be used yet it is advisable to use in each pair of partial images one of the fundamental colors although eventually differently shaded. Then the coloration of the screen elements can be simplified in this that for both compound pictures one set of screen elements is dyed in the color which is used in each of the two pairs of partial images and the other set in the mixed color of the two other fundamental colors.

It has already been said that the exposition of the sensitized layers 33 to 36 is preferably effected through color filters 37 to 40 in red, green, green and blue respectively. In order to get from the so obtained black white partial images suitably colored screened images 41, 42, the images may be printed with light of substantially the same colors as those with which they were taken, the printing preferably taking place on identically color screened sensitive layers, the colors of the screen elements being preferably purple and green. In order to produce from such two color screened pictures 41 and 42 a compound image 43, the stereoscopically co-ordinated elementary images of which can be brought to correct perception by the eyes of an observer so as to build up the impression of the corporal object in natural colors; the projection of pictures 41 and 42 should be effected through light filters 48, 49, the former comprising the colors red and yellowish green and the latter the colors blue and blueish green, or the former red and blueish green and the latter blue and yellowish green. The glasses 44, 45 of the spectacles with which the compound image 43 is to be inspected should be similar in coloration to the filters 48, 49. It is also possible to combine images 33 and 35 in one screened image and images 34 and 36 in the second screened image. Provided that in this case the light projection filters 48, 49 are for instance red, yellowish green and blue+blueish green respectively, the colors of the color selectors 44, 45 should be red+blueish green and blue+yellowish green.

The color effect of the compound image 43 is what is called an additive one.

The two pairs of pictures 33, 34 and 35, 36 can also be used for the stereoscopical reproduction of the object in conformity with a subtractive method. For this purpose the pairs of pictures 33, 34 and 35, 36 should be printed on an ordinary light sensitive plate so as to produce ordinary positives thereof. The positives should be produced on transparent films and the films dyed in this way that the positives of the pictures 33 and 36 are dyed in a color mixture of the two colors with which the pictures 34 and 35 had been taken (f. i. green) whereas the transparent positive films of the pictures 34 and 35 are dyed in the color mixture of the colors with which the sensitive layers for the pictures 33 and 36 had been exposed (f. i. purple=red+blue). The dyed films with the positive images of the pictures 33 and 36 and the films with the positives of the pictures 34 and 35 are superposed in such manner that on the one hand images 33 and 34 and on the other hand images 36 and 35 are in superposition. The compound films form substitutes of the pictures 41 and 42 of Figure 3 and can be projected with the colored light of the light filters 48 and 49 as described with reference to Figure 3. It results a compound image corresponding to the image 43 of Figure 3 which can be divided up into two images, giving color aspects of the object from different points of view so as to produce when presented to the eyes of the observer through the color selectors 44, 45 a stereoscopic image of the object in natural colors according to the subtractive method. Instead of producing a compound image by projection for being divided up by color selectors, one can use the pictures 33 to 36 for producing printed colored pictures for direct inspection, may it be in a stereoscope or with color separating spectacles.

In order to obtain printing plates for such pictures the pictures 33 to 36 are printed on sensitive layers f. i. with interposition of a screen as ordinarily used in three color printing. The printing plates so produced from the pictures 33 and 36 are combined to a compound printing plate which shows the positive of the picture 36 on the left side and that of picture 33 on the right side. In the same way the positives of the pictures 34 and 35 are combined to a printing plate. Each of the two compound printing plates so produced is inked with a color mixture containing the colors of the light filters through which the negatives for the printing plates of the elementary pictures of the other printing plate had been taken, that is to say, provided the pictures 33 to 36 had been taken with red, green, green and blue light respectively, the printing plate containing the positives of the pictures 33 and 36 is inked with green color and the printing plate containing the positives of pictures 34 and 35 is inked with purple color. Now the two compound printing plates are printed in superposition on a surface containing two differently colored sections.

The coloring of that section of the surface on which the positives of the pictures 36 and 35 are printed, being substantially a mixture of the colors with which the negatives 35 and 36 had been taken (f. i. green and blue) and the coloring of the portion of the surface on which the positives of the pictures 33 and 34 are printed in superposition being substantially a mixture of the colors with which the pictures 33 and 34 had been taken (f. i. red and green).

Figure 5:
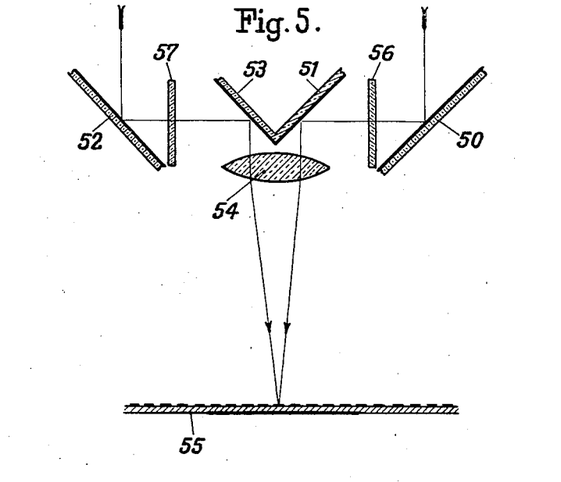
Figure 5 shows a device for directly producing a compound image combining a plurality of partial images showing different aspects of the object.
Figure 6:
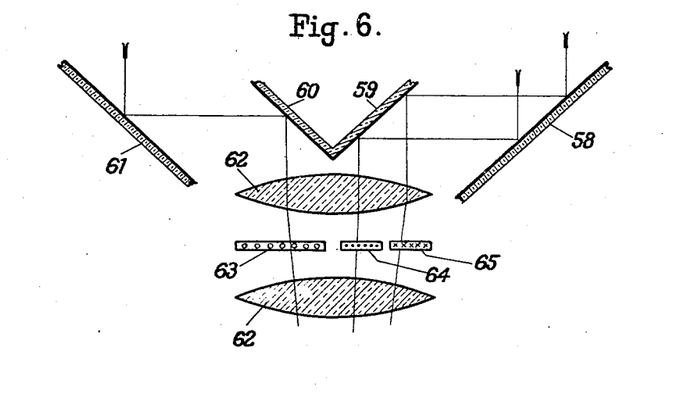
Figure 6 shows a modification of the device illustrated in Figure 5.

Instead of producing at first partial images of the object in black white and using these black white images for the production of a colored compound image it is possible to produce at once in one single step colored images by exposing of a color screened sensitive layer. Devices for working in this way are illustrated in Figures 5 and 6. In Figure 5 the numerals 50, 51 and 52, 53 designate two pairs of reflectors in the path of the rays coming from an object which is to be stereoscopically reproduced in natural colors. 54 is an objective adapted to produce from the beams of light reflected from reflectors 51 and 53 superimposed images on the light sensitive plate 55. The objective 54 is to be understood as being at the same time a diagrammatic representation of a pair of objectives separately co-ordinated to the two reflectors 52, 53. The plate 55 is provided with a color screening in the three fundamental colors of the spectrum. 56 and 57 are two light filters, the former colored in purple and the latter in green.

It appears that the rays coming from the side of the filters 56 on account of their being colored in purple only affect the red and blue screen elements of the plate 55 whereas the rays coming from the side of the filter 57 on account of their being colored in green affect the green screen elements of the plate 55. Therefore a screened colored compound image is produced which contains on the same area two kinds of stereoscopically co-ordinated images, the one set represented by the red and blue images and the other set by the green image. If a so obtained screened colored image is projected on a screen and contemplated with spectacles with green and purple glasses then the one eye of the observer receives only the green image and the other the red and blue images, the images presented to the two eyes being stereoscopically co-ordinated so that the impression of a stereoscopical reproduction of the object in natural colors is produced.

The picture 55 could also be directly inspected with spectacles having a purple and a green glass. The picture 55 could also be used as a luminous object in connection with a device similar to that with which it had been obtained.

The provision of the filters 56, 57 in the path of the rays of light allows the region of the spectrum covered by the color screen elements to be made broader than it could be done without said filters. This counteracts the loss in luminosity caused by the inspection of the colored screened images with the color selectors.

In order to reduce the conflict of colors in the stereoscopic image one could in analogy to the diagram of Figure 7 use the following color regions for the projection of the differently colored partial pictures; for the red picture the region of the spectrum from red at the long wave end to yellowish green with exclusion of orange and yellow, for the green picture the pure green and blueish green and for the blue picture the usual blue.

The color screening of the sensitized plate on which the images are produced could be substituted in a manner known per se, by splitting up of the beams of light coming from a point of the object under different conditions into comparatively small colored light pencils which are brought to action on a pan-chromatic sensitized layer. A suitable device is illustrated in Figure 6. In this figure the numerals 58, 59 and 60, 61 designate again as in Figure 5 two pairs of reflectors inserted into the path of the rays coming from the object to be stereoscopically reproduced. The rays reflected by the reflectors 59, 60 pass through the lenses of an objective 62 and on doing so pass through three color filters 63, 64, 65 arranged in the entrance pupil of the objective and then impinge on the back side of a sensitive layer carrier. This layer carrier is designated 66 and a sensitized layer is designated 67. The back side of the transparent layer carrier 66 directed towards the objective is molded into a system of small convexly curved sections 68 which form optical systems producing each a very small image of the entrance pupil of the objective 62 on the sensitized layer 67, so that each elementary portion of the image of the object is subdivided into subportions corresponding to the three light filters 63, 64, 65 in the entrance pupil of the objective. Therefore, if the image of the object produced on the sensitized layer 67 is illuminated from the back side, that is to say, from the free surface of the image layer 67, the light passing through the image layer 67 and its carrier 66 with the lens carrying surface 68 and then through the objective 62 with the light filters 63, 64, 65 is adapted to produce a colored compound image on a screen which image can be divided up in the same way by color selectors as described with reference to Figure 5, provided the filters 63, 64, 65 are suitably colored. A suitable coloring is f. i. green, red and blue.

For the purpose of making the projection it is not necessary that the filters between the elements of the objective have exactly the same color shades as the filters 63, 64, 65 through which the compound image on the sensitive layer 67 was produced. Figures 7 to 11 show suitable color co-ordinations for the filters 63 to 65 used for exposition and those used for projection. A proper color co-ordination is the more possible as the filters are easily interchangeable. No claim is laid on the method of splitting up of elementary portions of a photographic image by a system of small lenses such as the lenses 68; this being known and suggested by Messrs. Keller-Dorian and Berthon.

Instead of using a light filter device of three differently colored sections in the entrance pupil of the objective such as filters 63, 64, 65 a filter device may be used containing four or more sections of differently colored filters. This is of particular value. Assuming the compound image consists of three partial images in the three fundamental colors of the spectrum taken from one point of view and one further image taken from a second point of view, then the three image set may be used for non-stereoscopical reproduction of the object in natural colors it being only necessary to screen off the light filter co-ordinated to the fourth image. As to the form of the filters 63, 64, 65 it may still be mentioned that any convenient form may be used inclusive that of circular zones, the latter affording special advantages with regard to the correction of the objective and to proper distribution of the luminosity of the image.

Figure 12:
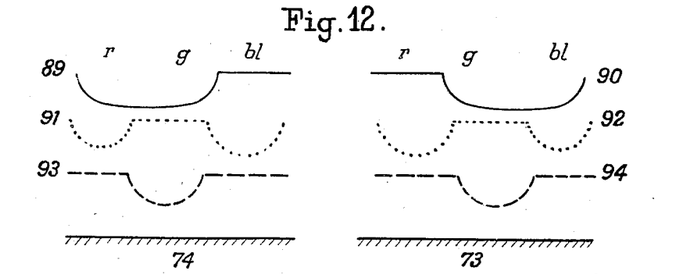
Figure 13:
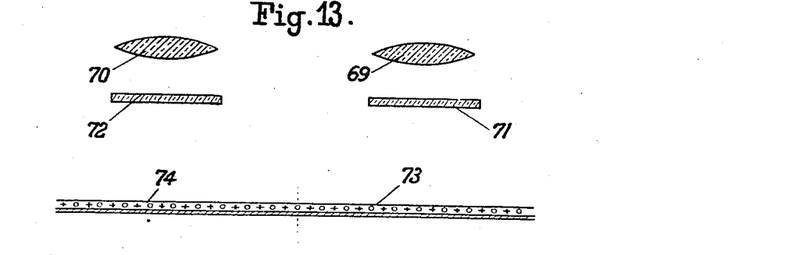
Figure 13 shows an arrangement for producing interlacing compound images on screened surfaces.

The method which has been described with reference to Figure 5 requires the production of color screened sensitive layers containing three or more sets of differently colored screen elements. As already has been mentioned the production of such color screened sensitive layers causes considerable difficulties. These difficulties are diminished if sensitive layers are used which are provided with a color screening in two colors only. An arrangement for effectively working with screened sensitive layers the color elements of which show only two different colors is illustrated in Figure 13. In this figure 69 and 70 are two objectives, 71 and 72 two light filters inserted in the path of the light rays coming from the object and 73 and 74 two color screened sensitive layers, each containing sections in two different colors, the one color being substantially a mixed color containing two fundamental colors of the spectrum and the other being substantially the third fundamental color. Suitable colors for the screen elements are before all purple and green. The light filters 71 and 72 are preferably colored the former in a mixed color containing green and blue and the latter in a mixed color containing red and green. The resulting color effects appear from Figure 12. In this figure the arcs of the full lines 89, 90 designate those regions of the spectrum for which the filters 71, 72 are permeable. The coloration corresponding to different portions of the lines is indicated with the letters "r" (red) "g" (green) and "b" (blue). The arcs in the dotted lines 91, 92 designate the zones of colored light permeability of the purple colored screen elements in the plates 73, 74 and the arcs in the interrupted lines 93, 94 the zones of colored light permeability of the green screen elements in the same plates 73, 74. It appears that white light becomes active on plate 73 only with its green and blue constituents and on plate 74 with its red and green constituents. Therefore on the sensitive layers 73 and 74 two stereoscopically co-ordinated images are produced, each being a compound image in purple and green, the purple partial image of the compound image 73 corresponding however only to the blue color aspect of the object and that of image 74 to the red color aspect of the object. If now the pictures 73 and 74 are inspected by means of a stereoscope the former through a light filter of the kind of the filter 71 with a mixed color containing green and blue and the latter through a light filter of the kind of the filter 72 with a mixed color containing red and green, then a stereoscopical reproduction of the object in natural colors presents itself to the observer.

The pictures 73 and 74 could also be projected with light in the colors of the filters 71 and 72 eventually suitably shaded on a screen and then be inspected through spectacles with glasses having substantially the colors of the projecting light.

Figure 14:
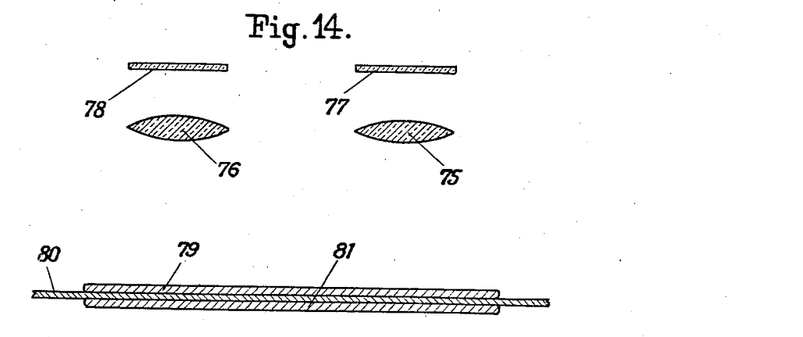
Figure 14 is a diagrammatic showing of an arrangement for producing images corresponding to different color aspects in superposition.

Instead of producing the compound pictures 73 and 74 on a screened sensitive layer in two colors so that the two elementary pictures of each of the compound pictures interlace each other, the elementary pictures could also be produced in superposition to each other. A suitable arrangement is illustrated in Figure 14 of the drawing where 75 and 76 are two objectives, 77 and 78 two light filters co-operating with the objectives and 79, 80 and 81 a light sensitive compound structure consisting in the illustrated embodiment which may be varied if desired of the non-sensitized carrier 80 and two sensitized layers 79 and 81 on different sides of the carrier, the two sensitized layers being sensitized for different colors, f. i. the layer 79 mainly for red and blue and the layer 81 for green. In view of the fact that it is impracticable or difficult to sensitize a layer for green only it is advisable to protect the layer 81 against unintentional influence of blue light by a yellow protective fluence layer which prevents that blue light passing through layers 79 and 80 reaching the layer 81. The yellow protective layer can be a separate layer or a yellow coloring of the carrier 80 or even the incorporation of a yellow dyestuff into the layer 81. If desired the layer 79 may be provided with a dyestuff which besides blue and violet absorbs also yellow and yellowish green; thereby the sensitivity of the layer for blue light can be reduced. After exposure of the light sensitive structure 79, 80, 81 the images are either developed as positives or the layers 79 and 81 are separated from their carrier and of each of them a positive is produced, such positive containing two stereoscopically co-ordinated images of the object. Each pair of positive images is dyed with a color corresponding to the mixture of the colors for which the sensitized layer on which the other image had been produced, had been sensitized, that is to say, the positive of the pair of images on layer 79 is dyed in green and the positive of the pair of images on layer 81 is dyed in purple, this being the mixed color of red and blue for which the layer 79 had been sensitized. The dyed positive pictures are superposed and thereafter used for producing the impression of a stereoscopical reproduction of the object in natural colors. To this end the superposed images may be projected this being effected with substantially the same light with which the negatives of the superposed images had been obtained, however with differentiation of the greenish color element, f. i. for one set of two superposed pictures a mixture of red and yellowish green and for the other two superposed pictures a mixture of blue and blueish green or for the former a mixture of red and blueish green and for the latter a mixture of blue and yellowish green should be used.

Equivalent to the projection with colored light is the incorporation of color into or on the image carrying layers, may it be that the layers are dyed in their whole mass or covered with a transparent color coating. In this case the projection may be made with white light.

The pictures projected in the manner described in superposition to each other can be divided up by an observer using spectacles, the glasses of which are substantially dyed in the colors of the projecting light.

The pairs of two superposed colored pictures can of course also be used for inspection in a stereoscope and must also in this case be illuminated with substantially the same colored light which is to be used for projection, however in this case the differentiation of the green color element is not necessary although it is advantageous to make use of it.

Also printing plates can be produced from the image carrying layers 79, 81 in the same way as formerly described in connection with pictures of a modified nature.

Figure 15:
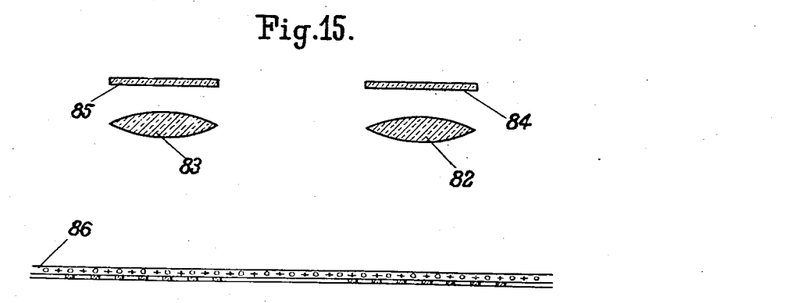
Figure 15 shows an arrangement for stereoscopical color cinematography.

In the foregoing it has been assumed that images of different color aspects of the object from the same point of view are produced on the same area whereas the stereoscopically co-ordinated images are produced on different areas. Now it is also possible to produce images of different color aspects of the object from different points of view on the same area. This possibility is of particular importance when a plurality of pictures is to be produced in succession showing the object in successive moments. Figure 15 shows an arrangement for producing images of this kind.

In Figure 15 82 and 83 are objectives, 84 and 85 colored light filters and 86 a strip of color screened light sensitive material. The strip 86 is assumed to be subjected to a step-by-step movement, although it may also be continuously moved in connection with suitable devices for optically compensating the movement of the strip. Suitable colors for the filters 84, 85 are for instance purple and green and a suitable color screening for the strip 86 the fundamental colors of the spectrum red, green and blue. If now images are taken from the object on the strip 86 at a certain position of the strip then the light passing through filter 84 and objective 82 produces on strip 86 an affection of the red and blue screen elements whereas the light passing through filter 85 and objective 83 produces at a different area of the strip an affection of the green screen elements; the two images so produced on different areas of the strip are stereoscopically co-ordinated. If now the strip is moved so that the area which had been exposed to the light passing through filter 84 and objective 82 is brought to the position where it is exposed through filter 85 and objective 83 then on the same area of the strip an affection of the green screen elements takes place so that at the same area a compound image is formed, the elements of which are stereoscopically co-ordinated, respresenting different color aspects of the object. Such stereoscopically co-ordinated images of the object presenting different color aspects are produced on further step-by-step movement of the strip on all areas of the strip, the stereoscopically co-ordinated images presenting aspects of the object in successive moments.

The methods formerly described for making use of the color screened images for the stereoscopical reproduction of the object in natural colors can be adopted. If the pictures are presented to the eyes of an observer in succession as they had been produced on the strip 86 then the observer receives the impression of the object as it changes in time, the method is in this case a method of stereoscopical cinematography in natural colors.

The Keller-Dorian and Berthon method for producing images for use in connection with this invention as described with reference to Figure 6 can also be used for producing a succession of images on a movable strip with two objectives as described just now with reference to Figure 15. In this case the arrangement of Figure 6 is to be used with suitable adaptation to the purpose. The adaptation being quite obvious for an expert; it needs only mentioning of one special point which may be explained with reference to Figure 16 of the drawing.

Figure 16:
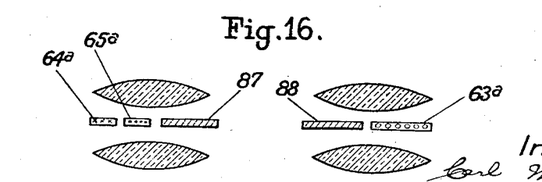
Figure 16 shows a modification of the filter arrangement of Figure 6 for cinematographic exposure.

In view of the fact that in this case two objectives laterally displaced with relation to each other are to be used it is necessary to take care that the light rays passing through one objective only affect one part of the sensitized surface and that the remaining portion of each area which has not been affected by the light during exposition through one objective is affected by the light passing through the other objective when said area of the sensitive strip is brought into exposure position with relation to the second objective.

In order to avoid the affecting of the whole area of the sensitive strip when in position for exposition through one objective the color filters in the plane of the entrance pupil of the objectives are so arranged that they only are passed by the light which passes through one portion of the objectives whereas the light passing through a further portion of the objectives is prevented by an impermeable screen against impinging on the sensitive strip. A suitable screen arrangement is shown in Figure 16 of the drawing where the numerals 64ᵃ and 65ᵃ designate a red and a blue filter respectively and the numeral 63ᵃ a green filter. 87 and 88 are impermeable screens arranged in the plane of the filters 63ᵃ to 65ᵃ. In this case the sensitive strip is provided with the small lens system as illustrated in Figure 6 and described with relation thereto.

What we claim is:—

1. In a method of streoscopical color photography the step of selecting a plurality (two or more) of portions of light emitted from the colored object to be stereoscopically reproduced under different conditions and forming thereof differently colored image producing beams, exposing sentitive layers with said beams of light so as to form partial images of the object corresponding to differently colored aspects of same and reproducing a partial image so produced in a co-ordinated color on a sensitized screened layer.

2. In a method of stereoscopical color photography the step of selecting a plurality (two or more) of portions of light emitted from the colored object under different conditions and forming thereof differently colored image producing beams exposing sensitive layers with said beams of light so as to form partial images of the object corresponding to differently colored aspects of same and printing two or more partial images so produced substantially with the colors with which they were produced on a sensitized screened layer, the screen elements of said layer appearing in two or more different colors.

3. In a method of sterescopical color photography the step of selecting a plurality (two or more) of portions of light emitted from the colored object under different conditions and forming thereof differently colored image producing beams exposing sensitive layers with said beams of light so as to form partial images of the object corresponding to differently colored aspects of same and simultaneously printing two or more partial images so produced on a sensitized screened layer, the screen elements of said layer appearing in two or more different colors.

4. In a method of stereoscopical color photography the step of selecting a plurality (two or more) of portions of light emitted from the colored object under different conditions and forming thereof differently colored image producing beams exposing a sensitized screened layer to the action of said colored image producing beams of light, the elements of said layer being grouped in sets, the different sets being acted on so as to make them appear in different colors.

5. In a method of stereoscopical color photography the step of selecting a plurality (two or more) of portions of light emitted from the colored object under different conditions and forming thereof differently colored image producing beams exposing a sensitized screened layer to the action of said colored image producing beams of light, the elements of said layer being grouped in sets of which each has its individual color different from the color of each other set, one of which containing besides the color of the original image producing beam additional colors corresponding to limited different portions of the spectrum.

6. In a method of stereoscopical color photography the step of selecting a plurality (two or more) of portions of light emitted from the colored object under different conditions and forming thereof differently colored image producing beams exposing a sensitized screen layer to the action of said colored image producing beams of light, the elements of said layer being grouped in sets of which each has its individual color different from the color of each other set, one of which containing besides the color of the original image producing beam additional colors corresponding to such portions of the spectrum which are adjacent to that portion which corresponds to the color of the original image producing beam.

7. In a method of stereoscopical color photography the step of selecting a plurality (two or more) of portions of light emitted from the colored object under different conditions and forming thereof differently colored image producing beams exposing a sensitized screened layer to the action of said colored image producing beams of light, the elements of said layer being grouped in sets, the different sets being acted on so as to make them appear in colors substantially identical with the colors of the original image producing beams, such colors corresponding to overlapping portions of the spectrum.

8. In a method of stereoscopical color photography the step of selecting a plurality (two or more) of portions of light emitted from the colored object under different conditions and forming thereof differently colored image producing beams exposing a sensitized screened layer to the action of said colored image producing beams of light, the elements of said layer being grouped in sets of which each has its individual color different from the color of each other set, the colors of the image producing beams and of the sets of screen elements being so chosen and correlated that the colors of the sets of screen elements correspond to overlapping regions of the spectrum and that each of said regions of the specturm comprises the color of one of said image producing beams whereas the region of spectrum corresponding to the colored image producing beam is more limited than the region of the corresponding set of screen elements.

9. In a method of stereoscopical color photography the step of selecting a plurality (two or more) of portions of light emitted from the colored object under different conditions and forming thereof differently colored image producing beams exposing a sensitized screened layer to the action of said colored image producing beams of light, the elements of said layer being grouped in sets of which each has its individual color different from the color of each other set, the colors of said screen elements being such that they correspond to portions of the spectrum which overlap each other, said portions corresponding substantially to the color of the original image producing beams, the printing color being so selected that it can pass through one kind of the colored screen elements only which is co-ordinated thereto.

10. In a method of stereoscopical color photography the step of selecting a plurality (two or more) of portions of light emitted from the colored object under different conditions and forming thereof differently colored image producing beams exposing a sensitized screened layer to the action of said colored image producing beams of light, the elements of said layer being grouped in sets of which each has its individual color different from the color of each other set, the colors of the image producing beams and of the sets of screen elements being so chosen and correlated that the colors of the set of screen elements correspond to overlapping regions of the spectrum and that each of said regions of the spectrum comprises the color of one of said image producing beams whereas the region of spectrum corresponding to the colored image producing beams is more limited than the region of the corresponding set of screen elements, the limitation being so that the region of the spectrum corresponding to the color of the image producing beams is substantially outside the region of the spectrum corresponding to a further set of screen elements.

11. In a method of stereoscopical color photography the step of producing two pairs of stereoscopically co-ordinated photographic images of the object to be reproduced with colored light, the images of the one pair each substantially with light in one of the three fundamental colors of the spectrum and both images of the other pair substantially with light in the third fundamental color dyeing both images of the one pair in a mixed color containing two fundamental colors and both images of the other pair in the third fundamental color.

12. A method of stereoscopical color photography comprising producing two pairs of stereoscopically co-ordinated photographic pictures of the object using for each picture of one pair one of the three fundamental colors of the spectrum and for both pictures of the second pair that fundamental color of the spectrum which had not been made use of in producing the first pair, dyeing the first pair in the last named color and the second pair in a mixed color containing the other two fundamental colors.

13. A method of stereoscopical color photography comprising producing two pairs of stereoscopically co-ordinated photographic pictures using substantially red and blue light for producing the pictures of the one pair and substantially green light for both pictures of the other pair, dyeing the first pair with green and the second pair with purple color and superposing the said two pairs of uniformly colored images.

14. A method of stereoscopical color photography comprising producing two pairs of stereoscopically co-ordinated photographic images in superimposed transparent sensitive layers of which the front layer is sensitized substantially for red and blue light and the back layer substantially accessible to green light only but protected against red and blue light, the exposure being effected for the one image of the pairs with a red and a green colored light mixture and for the other with a mixture of green and blue light, dyeing the pictures of the front layer with green color and those of the back layer with purple color.

15. A method of stereoscopical color photography comprising producing two sets of stereoscopically co-ordinated images, the one set consisting of a plurality of images, the images being obtained by exposing the respective sensitive layers with differently colored kinds of light.

16. A method of stereoscopical color photography comprising producing a plurality of photographic images of the object forming two sets of stereoscopically co-ordinated images, the one set consisting of three images each obtained by exposing a sensitive layer with light of one fundamental color substantially.

17. A stereoscopic picture comprising a plurality of interlacing partial images of an object to be stereoscopically reproduced whereof at least two interlacing images are stereoscopically co-ordinated to each other.

18. A stereoscopic picture comprising a plurality of interlacing partial images of an object to be stereoscopically reproduced, said plurality of the partial images comprising at least two images representing aspects of the object at different moments, two or more of the interlacing images being stereoscopically co-ordinated.

19. A stereoscopic picture comprising a plurality of interlacing partial images of an object to be stereoscopically reproduced, said plurality of the partial images comprising at least two images representing aspects of the object at different moments, at least two of said last named images being stereoscopically co-ordinated to each other.

20. A compound picture for stereoscopic reproduction of an object comprising two partial images on the same area the one in purple and the other in green color.

21. A compound picture for stereoscopic reproduction of an object comprising two interlacing partial images on the same surface the one in purple and the other in green color.

22. A picture for stereoscopic reproduction of an object comprising two compound images in lateral co-ordination to each other, each compound image consisting of two images, the one purple and the other in green color the two compound images being stereoscopically co-ordinated to each other.

23. A picture for stereoscopic reproduction of an object comprising two compound images in lateral co-ordination to each other, each compound image consisting of two interlacing partial images on the same area the one purple and the other in green color, the two compound images being stereoscopically co-ordinated to each other.

24. A compound picture for stereoscopic reproduction of an object comprising two partial images on the same area, the one colored substantially in one fundamental color of the spectrum and the other colored in a mixed color containing substantially the two other fundamental colors of the spectrum.

25. A compound picture for stereoscopic reproduction of an object comprising two interlacing partial images on the same surface, the one colored substantially in one fundamental color of the spectrum and the other colored in a mixed color containing substantially the two other fundamental colors of the spectrum.

26. A compound picture for stereoscopic reproduction of an object comprising two partial images on the same area, the one colored substantially in one fundamental color of the spectrum and the other colored color of the spectrum containing substantially the two other fundamental colors of the spectrum, the field where the two partial images are provided being colored in a mixed color containing at least partly the color of that image which is colored in the one fundamental color and at least partly the color of one of the two fundamental colors contained in the coloring of the second image.

27. A compound picture for stereoscopic reproduction of an object comprising two interlacing partial images on the same surface, the one colored substantially in one fundamental color of the spectrum and the other colored in a mixed color containing substantially the two other fundamental colors of the spectrum, the field where the two partial images are provided being colored in a mixed color containing at least partly the color of that image which is colored in the one fundamental color and at least partly the color of one of the two fundamental colors contained in the coloring of the second image.

28. A picture for stereoscopic reproduction of an object comprising two compound images in lateral co-ordination to each other, each compound image consisting of two images the one purple and the other in green color the two compound images being stereoscopically co-ordinated to each other, the fields where the two compound images are provided being colored in mixed colors, the mixed color of the one containing green and red and that of the other green and blue.

29. A picture for stereoscopic reproduction of an object comprising two compound images in lateral co-ordination to each other, each compound image consisting of two interlacing partial images on the same area the one purple and the other in green color, the two compound images being stereoscopically co-ordinated to each other, the fields where the two compound images are provided being colored in mixed colors, the mixed color of the one containing green and red and that of the other green and blue.

30. A picture for stereoscopic reproduction of an object comprising two compound images in lateral co-ordination to each other, each compound image consisting of two images the one substantially in one fundamental color and the other in a mixed color containing substantially the two other fundamental colors of the spectrum, the elementary images of at least one of the compound images being stereoscopically co-ordinated to each other and at least one of them being stereoscopically co-ordinated to at least one of the elementary images of the other compound image.

In testimony whereof, we affix our signatures.

Dr. CARL MÜLLER.
ELSA MÜLLER.